(12) United States Patent
Mokri

(10) Patent No.: US 6,396,176 B1
(45) Date of Patent: May 28, 2002

(54) ELECTRIC MOTOR FAN SEAL RING

(75) Inventor: James S. Mokri, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/553,779

(22) Filed: Apr. 21, 2000

(51) Int. Cl.[7] .............................. H02K 9/00; H02K 9/06
(52) U.S. Cl. .............................. 310/58; 310/59; 310/62
(58) Field of Search .............................. 310/85, 86, 52, 310/58, 59, 62, 63

(56) References Cited

U.S. PATENT DOCUMENTS

| | | | | |
|---|---|---|---|---|
| 2,873,393 A | * | 2/1959 | Baudry ........................ | 310/58 |
| 2,991,377 A | * | 7/1961 | Vose et al. .................... | 310/62 |
| 4,186,317 A | | 1/1980 | Sisk .......................... | 310/60 R |
| 4,264,834 A | | 4/1981 | Armor et al. ................. | 310/59 |
| 4,286,183 A | * | 8/1981 | Montgomery ............... | 310/62 |
| 4,301,386 A | * | 11/1981 | Schweder et al. ............ | 310/59 |
| 4,443,723 A | * | 4/1984 | Ohkubo ....................... | 310/53 |
| 4,682,064 A | | 7/1987 | Crounse et al. .............. | 310/61 |
| 4,686,399 A | * | 8/1987 | Imori et al. .................. | 310/62 |
| 5,134,329 A | * | 7/1992 | Lang .......................... | 310/63 |
| 5,276,373 A | | 1/1994 | Zimmermann et al. ....... | 310/58 |
| 5,557,153 A | * | 9/1996 | Zimmermann ............... | 310/56 |
| 5,635,779 A | * | 6/1997 | Baer et al. ................... | 310/62 |

* cited by examiner

*Primary Examiner*—Burton S. Mullins
*Assistant Examiner*—Dang Dinh Le
(74) *Attorney, Agent, or Firm*—Armstrong Teasdale LLP

(57) ABSTRACT

An electric motor cooling fan having a seal ring reduces cooling air recirculation inside the motor which increases the cooling of motor windings for the prevention of motor failures and increases motor reliability. The cooling fan includes two opposed, spaced apart, and substantially circular fan shrouds. A plurality of fan blades extend between and are attached to the fan shrouds. The fan blades are spaced circumferentially around the fan shrouds. The seal ring is coupled to one shroud and extends from an outer surface of the shroud ring. The seal ring has a substantially cylindrical shape and is sized to provide a minimal clearance between an internal air deflector and the seal ring to minimize the flow of air through a space between the shroud ring and the air deflector.

15 Claims, 2 Drawing Sheets

ELECTRIC MOTOR FAN SEAL RING

BACKGROUND OF THE INVENTION

This invention relates generally to electric motors and more particularly, to seal rings for air cooled electric motors with rotor mounted cooling fans.

Known electric motors typically include a motor housing, a stator, and a rotor assembly. The rotor assembly includes a rotor core and a rotor shaft extending through the core. The housing includes a shell and two endshields and houses at least a portion of the rotor assembly. Electric motors also include at least one bearing sized to receive the rotor shaft. Typically the bearings are coupled to the endshields with brackets or other mountings. The endshields attach to ends of the frame housing shell.

For reliable performance, most large electric motors include internal fans mounted on the rotor shaft to cool the motor windings. The fans move cooling air past the stator windings to prevent winding failures and to increase the life and reliability of the motor. Known large electric motors include a gap or clearance between the fan and a mating air deflector to allow for manufacturing variations. This clearance between the fan and the air deflector has a disadvantage of permitting air to recirculate and thus reduce the cooling air to the stator windings. Additionally in large electric motors that include air coolers, air recirculated between the gap or clearance between the air deflector and the fan does not pass through the air cooler which raises the temperature of the cooling air and thus providing less cooling to the stator windings. Further, failures and major maintenance of large electric motors, such as nuclear reactor recirculation pump motors, in plants have a large impact on plant operating costs and maintenance costs.

It would be desirable to provide an electric motor with reduced cooling air recirculation and increased cooling of motor windings to prevent motor failures and increase motor reliability.

BRIEF SUMMARY OF THE INVENTION

An electric motor cooling fan having a seal ring reduces cooling air recirculation inside the motor which increases the cooling of motor windings for the prevention of motor failures and increases motor reliability. The cooling fan includes two opposed, spaced apart, and substantially circular fan shrouds. A plurality of fan blades extend between and are attached to the fan shrouds. The fan blades are spaced circumferentially around the fan shrouds.

The seal ring is coupled to one shroud and extends from an outer surface of the shroud ring. The seal ring has a substantially cylindrical shape and is sized to provide a minimal clearance between an internal air deflector and the seal ring to minimize the flow of air through a space between the shroud ring and the air deflector.

At least one cooling fan cools an electric motor by drawing air from an air cooler air plenum through air pathways and directing the air into air passages extending through the motor rotor core and stator. The air removes heat from the rotor core and the stator core as it flows through the air passages and air plenums above and below the rotor and stator cores. The air then enters into an air cooler to be cooled and is discharged back into the air cooler air plenum. The seal ring prevents air from exiting the air plenum through a gap between the air deflector and the cooling fan. Without the seal ring, air enters the plenum and a portion of the air exits through the gap and then recirculates back to the fan intake. This recirculated air is not cooled because it does not pass through the air cooler. The recirculated air increases the temperature of the cooling air entering the rotor core and stator air passages and lowers the cooling efficiency of the cooling air and causes the motor to operate at increased temperatures. Operation at elevated temperatures causes premature failure of stator and/or rotor core windings.

The above described seal rings attached to electric motor cooling fans reduce internal air recirculation and increases cooling of motor windings to prevent motor failures and increase motor reliability.

DETAILED DESCRIPTION OF THE INVENTION

Figure 1:
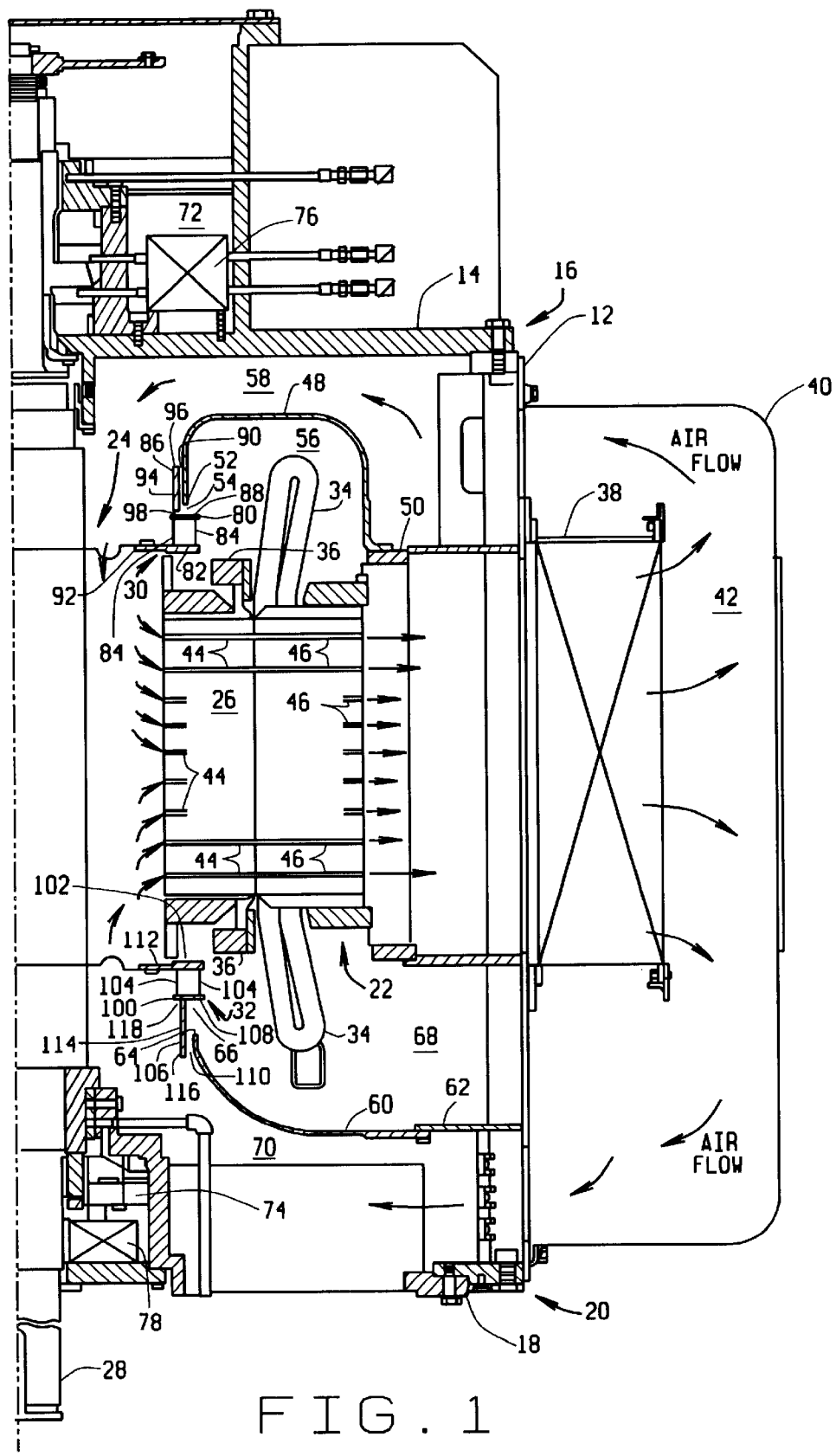
FIG. 1 is a longitudinal axial fragmentary sectional view of an electric motor in accordance with an embodiment of the present invention.

FIG. 1 is a longitudinal axial fragmentary sectional schematic view of an air cooled vertical electric motor assembly 10 in accordance with an exemplary embodiment of the present invention. Electric motor assembly 10 can be used to drive mechanical equipment such as, for example a pump or a fan. In one embodiment, motor assembly 10 is used to drive a pump in a cooling water pumping system in, for example, a nuclear reactor in a nuclear power plant. Of course, in other embodiments, motor assembly 10 can be, for example, a horizontally mounted motor.

Motor assembly 10 includes a motor housing 12, an upper endshield assembly 14 coupled to housing 12 at a first end 16, and a lower endshield assembly 18 coupled to housing 12 at a second end 20.

Motor assembly 10 also includes a stator 22 and a rotor assembly 24. Rotor assembly 24 includes a rotor core 26 and a rotor shaft 28 extending through rotor core 26. Rotor assembly 24 also includes an upper cooling fan 30 and a lower cooling fan 32 coupled to rotor core 26 to cool the plurality of windings 34 of stator 22 and the plurality of windings 36 of rotor core 26. An air cooler 38 for extracting heat from the cooling air directed through rotor core 26 and stator 22 by cooling fans 30 and 32 is attached to housing 12. An air cooler housing 40 is also attached to housing 12 and forms an air plenum 42 around air cooler 38. A plurality of cooling air passages 44 and 46 extend radially through rotor core 26 and stator 22 respectively.

An upper air deflector 48 extends from and is attached to an upper stator mounting bracket 50. An end 52 of upper air deflector 48 is located adjacent upper cooling fan 30 and defines a gap 54 between end 52 of upper air deflector 48 and upper cooling fan 30. Upper air deflector 48 forms an air plenum 56 above rotor core 26 and stator 22, and forms an air pathway 58 between upper endshield 14 and upper air deflector 48.

A lower air deflector 60 extends from and is attached to a mounting bracket 62. An end 64 of lower air deflector 60 is located adjacent lower cooling fan 32 and defines a gap 66 between end 64 of lower deflector 60 and lower cooling fan 32. Lower air deflector 60 forms an air plenum 68 below rotor core 26 and stator 22, and forms an air pathway 70 between lower endshield 18 and lower air deflector 60.

Motor 10 also includes an upper oil reservoir 72 and a lower oil reservoir 74. A first oil cooler 76 is located in upper oil reservoir 72 and a second oil cooler 78 is located in lower oil reservoir 74. Oil coolers 76 and 78 cool the oil present in oil reservoirs 72 and 74 respectively. The oil is used to cool and lubricate core shaft 28 bearings.

Figure 2:
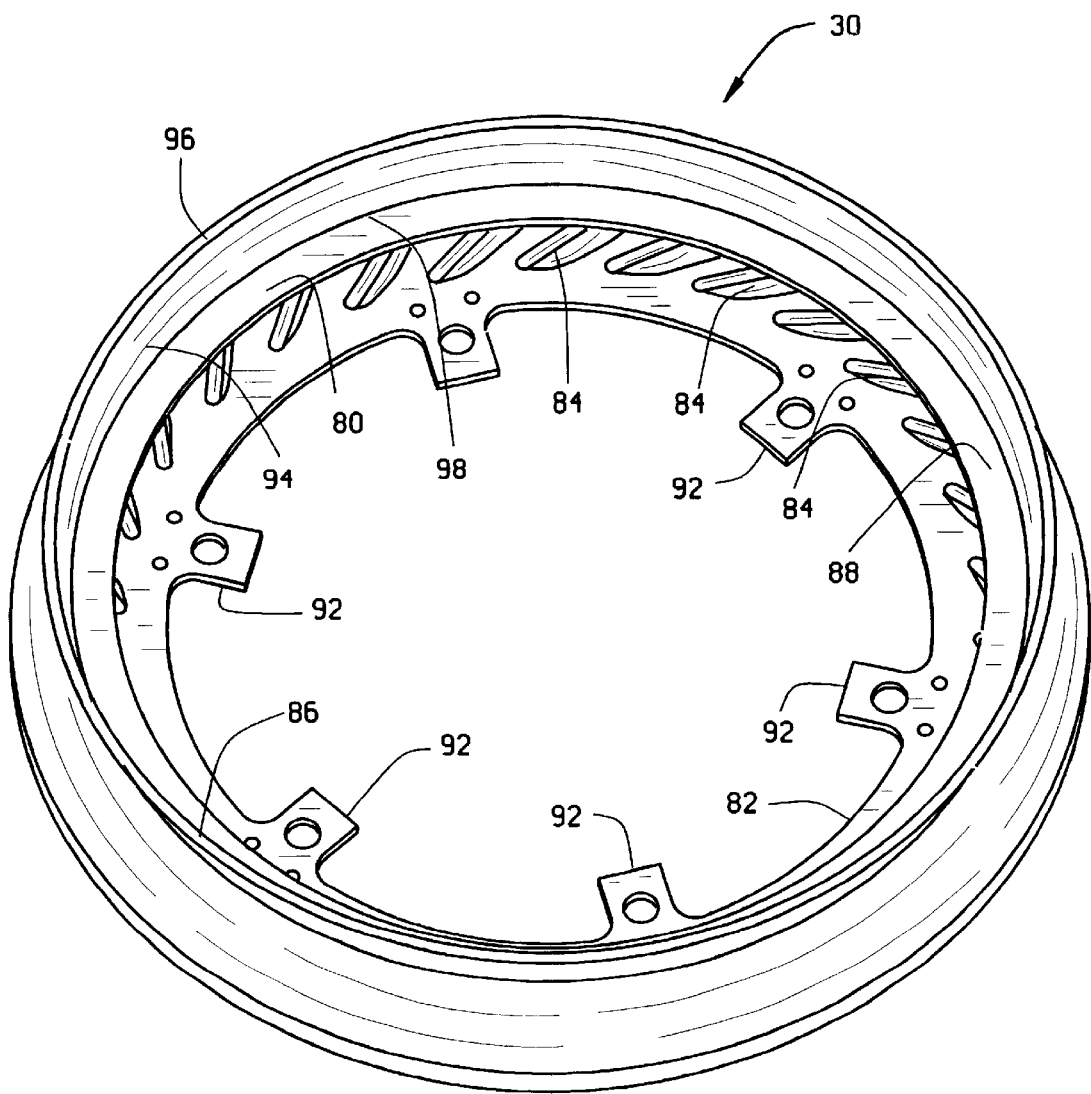
FIG. 2 is a perspective view of one fan and seal ring assembly shown in FIG. 1.

Referring also to FIG. 2, upper cooling fan 30 includes a first shroud ring 80, a second shroud ring 82, and a plurality of fan blades 84 extending between and coupled to first and second shroud rings 80 and 82. A seal ring 86 extends from an outer surface 88 of first shroud ring 80. Seal ring 86 is substantially cylindrically shaped and is located to extend adjacent upper air deflector 48 with a minimum clearance or gap 90 between air deflector 48 and seal ring 86 to minimize the flow of air through gap 54. In one embodiment, gap 90 between air deflector 48 and seal ring 86 is about 0.1 inch to about 0.8 inch. In another embodiment, gap 90 is about 0.1 inch to about 0.6 inch. A plurality of attachment lugs 92 extend from an inner circumference of second shroud ring 82. Attachment lugs 92 are used to attach upper cooling fan 30 to rotor core 26.

Seal ring 86 includes a substantially cylindrically shaped body 94 having a first end 96 and a second end 98. Second end 98 of seal ring body 94 is coupled to outer surface 88 of first shroud ring 80. Particularly, seal ring body 94 extends substantially perpendicular to first shroud ring 80 with first end 96 of body 94 adjacent upper air deflector 48. Seal ring body 94 is coupled to first shroud ring 80 by any known method of attachment such as, for example by welding or with fasteners.

Lower cooling fan 32 is similar to upper cooling fan 30 and includes a first shroud ring 100, a second shroud ring 102, and a plurality of fan blades 104 extending between and coupled to first and second shroud rings 100 and 102. A seal ring 106 extends from an outer surface 108 of first shroud ring 100. Seal ring 106 is substantially cylindrically shaped and is located to extend adjacent to lower air deflector 60 with a minimum clearance or gap 110 between air deflector 60 and seal ring 106 to minimize the flow of air through gap 66. In one embodiment, gap 110 between air deflector 60 and seal ring 106 is about 0.1 inch to about 0.8 inch. In another embodiment, gap 110 is about 0.1 inch to about 0.6 inch. A plurality of attachment lugs 112 extend from an inner circumference of second shroud ring 102. Attachment lugs 112 are used to attach lower cooling fan 32 to rotor core 26.

Seal ring 106 is identical to seal ring 86 described above, and includes a substantially cylindrically shaped body 114 having a first end 116 and a second end 118. Second end 118 of seal ring body 114 is coupled to outer surface 108 of first shroud ring 100. Particularly, seal ring body 114 extends substantially perpendicular to first shroud ring 100 with first end 116 of body 114 adjacent upper air deflector 48. Seal ring body 114 is coupled to first shroud ring 100 by any known method of attachment such as, for example by welding or with fasteners.

Upper and lower cooling fans 30 and 32 cool motor 10 by drawing air from air cooler air plenum 42 through upper and lower air pathways 58 and 70 and directing the air into air passages 44 and 46 extending through rotor core 26 and 22 and upper and lower air plenums 56 and 68. The air removes heat from rotor core 26 and stator 22 as it flows through air passages 44 and 46 and air plenums 56 and 58. The air then enters into air cooler 38 to be cooled and is discharged back into air cooler air plenum 42. Seal rings 86 and 106 prevent air from exiting plenum 56 and 68 through gaps 54 and 66 between upper and lower air deflectors and upper and lower cooling fans 30 and 32 respectively. For example, without seal ring 86, air enters plenum 56 and a portion of the air exits through gap 54 and then recirculates back into plenum 56. This recirculated air increases in temperature because it does not pass through air cooler 38. The recirculated air increases the temperature of the cooling air entering air passages 44 and 46 in rotor core 26 and stator 22 and lowers the cooling efficiency of the cooling air and causes motor 10 to operate at increased temperatures. Operation at elevated temperatures causes premature failure of stator and/or rotor core windings 34 and 36.

The above described motor 10 includes seal rings 86 and 106 attached to cooling fans 30 and 32 which reduce cooling air recirculation and increases cooling of motor windings to prevent motor failures and increase motor efficiency.

While the invention has been described in terms of various specific embodiments, those skilled in the art will recognize that the invention can be practiced with modification within the spirit and scope of the claims.

What is claimed is:

1. A fan for an electric motor, the electric motor including at least one air deflector, a stator, and a rotor assembly, the rotor assembly including a rotor core and a rotor shaft extending through the rotor core, said fan configured to attach to the electric motor rotor assembly, said fan comprising:

a first shroud ring having a substantially circular shape;

and a seal ring coupled to said first shroud ring to form a multi-component assembly, said seal ring extending from an outer surface of said first shroud ring, said seal ring comprising a body having a substantially cylindrical shape, said body comprising a first end and a second end, said body sized to provide a predetermined gap between an air deflector and said seal ring to minimize the flow of cooling air through a space between said first shroud ring and the air deflector.

2. A fan in accordance with claim 1 further comprising:

a second shroud ring having a substantially circular shape and spaced apart from said first shroud ring; and a plurality of fan blades extending between and attached to said first and second fan shrouds, said fan blades spaced circumferentially around said fan shrouds.

3. A fan in accordance with claim 1 wherein said seal ring extends substantially perpendicularly from said outer surface of said first shroud ring.

4. A fan in accordance with claim 1 wherein said second end of said body of said seal ring is welded to said first shroud ring.

5. A fan in accordance with claim 1 wherein said second end of said body of seal ring is coupled to said first shroud ring with fasteners.

6. An electric motor comprising:

a motor housing;

a stator mounted in said housing and comprising a bore therethrough;

a rotor core rotatably mounted in said housing and extending through said stator bore;

a rotor shaft extending through said rotor core;

at least one endshield assembly;

at least one cooling fan coupled to said rotor shaft, each said fan comprising a first shroud ring having a substantially circular shape;

at least one air deflector, each said air deflector positioned adjacent an end of said stator and said rotor core, said air deflector and said end of said stator defining a chamber in said motor, said air deflector comprising an end located adjacent said cooling fan, said air deflector sized so that there is a gap between said cooling fan and said air deflector end; and a seal ring coupled to each said first shroud ring to form a multi component assembly, said seal ring extending from an outer surface of said fan first shroud ring, said seal ring comprising a body having a substantially cylindrical shape, said body comprising a first end and a second end, said body sized to provide a minimal clearance between said air deflector and said seal ring to minimize the flow of cooling air through said gap between said fan first shroud ring and said air deflector.

7. A motor in accordance with claim 6 wherein each said cooling fan further comprises:

a second shroud ring having a substantially circular shape and spaced apart from said first shroud ring; and a plurality of fan blades extending between and attached to said first and second fan shrouds, said fan blades spaced circumferentially around said fan shrouds.

8. A motor in accordance with claim 7 wherein said stator comprises a plurality of air flow passages extending axially through said stator.

9. A motor in accordance with claim 8, wherein said rotor core further comprises a plurality of air flow passages extending axially through said rotor core.

10. A motor in accordance with claim 9, further comprising an air cooler, said air cooler in flow communication with said rotor air flow passages and said stator air flow passages.

11. A motor in accordance with claim 6 wherein said seal ring extends substantially perpendicularly from said outer surface of said first shroud ring.

12. A motor in accordance with claim 6 wherein said second end of said body of said seal ring is welded to said first shroud ring.

13. A motor in accordance with claim 6 said second end of said body of seal ring is coupled to said first shroud ring with fasteners.

14. A motor in accordance with claim 6 wherein a clearance between said seal ring and said air deflector is about 0.1 inch to about 0.8 inch.

15. A motor in accordance with claim 14 wherein a clearance between said seal ring and said air deflector is about 0.1 inch to about 0.6 inch.

* * * * *